(12) United States Patent
Whiteman et al.

(10) Patent No.: US 8,290,816 B2
(45) Date of Patent: Oct. 16, 2012

(54) LOTTERY SALES SYSTEMS AND METHODOLOGY FOR SUPPORTING CROSS-PLATFORM REPORTING

(75) Inventors: Janine Whiteman, Alpharetta, GA (US); Burbank Herndon, Alpharetta, GA (US); Todd Hopkins, Cumming, GA (US); William F. Behm, Roswell, GA (US)

(73) Assignee: Scientific Games International, Inc., Newark, DE (US)

( * ) Notice: Subject to any disclaimer, the term of this patent is extended or adjusted under 35 U.S.C. 154(b) by 712 days.

(21) Appl. No.: 12/333,413

(22) Filed: Dec. 12, 2008

(65) Prior Publication Data
US 2009/0163264 A1  Jun. 25, 2009

Related U.S. Application Data

(60) Provisional application No. 61/014,977, filed on Dec. 19, 2007.

(51) Int. Cl.
*G06G 1/14* (2006.01)
*A63F 13/00* (2006.01)
*G06Q 40/00* (2012.01)

(52) U.S. Cl. .............. 705/22; 463/17; 235/379
(58) Field of Classification Search .......... 705/28; 463/17; 235/379
See application file for complete search history.

(56) References Cited

U.S. PATENT DOCUMENTS

| | | | |
|---|---|---|---|
| 5,216,595 A | 6/1993 | Protheroe | |
| 5,239,165 A * | 8/1993 | Novak | 235/375 |
| 5,272,321 A * | 12/1993 | Otsuka et al. | 235/381 |
| 5,399,846 A * | 3/1995 | Pavlidis et al. | 235/462.1 |
| 5,496,071 A * | 3/1996 | Walsh | 283/70 |
| 5,969,324 A * | 10/1999 | Reber et al. | 235/462.13 |
| 6,091,510 A * | 7/2000 | Kazo | 358/1.18 |
| 6,189,781 B1 * | 2/2001 | Yoshinaga et al. | 235/375 |
| 6,199,044 B1 * | 3/2001 | Ackley et al. | 704/275 |
| 6,267,670 B1 | 7/2001 | Walker et al. | |
| 6,460,763 B1 * | 10/2002 | Yoshinaga et al. | 235/375 |
| 6,484,933 B1 * | 11/2002 | Zimmerman et al. | 235/375 |
| 6,753,977 B2 * | 6/2004 | Hoover | 358/1.9 |
| 6,899,621 B2 | 5/2005 | Behm et al. | |
| 6,935,559 B2 * | 8/2005 | Mollett et al. | 235/382.5 |
| 6,952,281 B1 * | 10/2005 | Irons et al. | 358/1.15 |
| 7,537,162 B1 * | 5/2009 | Siu | 235/462.01 |

(Continued)

FOREIGN PATENT DOCUMENTS

JP  2007 004753  1/2007

(Continued)

OTHER PUBLICATIONS

PCT Search Report, Apr. 22, 2009.

*Primary Examiner* — Elaine Gort
*Assistant Examiner* — Ashford S Hayles
(74) *Attorney, Agent, or Firm* — Dority & Manning, P.A.

(57) ABSTRACT

A lottery sales method and related system utilizes a computing device interfaced to a printer. The device is configured to track inventory of activated instant tickets and access sales reporting data, the sales reporting data indicating total sales of at least one lottery product of interest. For each lottery product of interest, a machine-readable indicator is generated corresponding to the total sales of the lottery product of interest. A report is printed that includes each generated machine-readable indicator.

7 Claims, 4 Drawing Sheets

U.S. PATENT DOCUMENTS

| | | |
|---|---|---|
| 7,561,287 B1 * 7/2009 | Antonacci et al. | 358/1.15 |
| 7,676,396 B1 * 3/2010 | White | 705/24 |
| 7,747,342 B2 * 6/2010 | Glynn | 700/214 |
| 8,066,187 B2 * 11/2011 | Zsigmond et al. | 235/462.01 |
| 2002/0100785 A1 8/2002 | Roberts et al. | |
| 2003/0088471 A1 * 5/2003 | Tanigaki et al. | 705/20 |
| 2004/0193464 A1 * 9/2004 | Szrek et al. | 705/7 |
| 2004/0193497 A1 * 9/2004 | Tanaka | 705/16 |
| 2005/0021492 A1 * 1/2005 | Safaei et al. | 707/1 |
| 2005/0024682 A1 * 2/2005 | Hull et al. | 358/1.18 |
| 2005/0043855 A1 * 2/2005 | Kimura | 700/237 |
| 2005/0108164 A1 * 5/2005 | Salafia et al. | 705/42 |
| 2005/0153779 A1 * 7/2005 | Ziegler | 463/43 |
| 2005/0169496 A1 * 8/2005 | Perry | 382/100 |
| 2005/0233797 A1 * 10/2005 | Gilmore et al. | 463/17 |
| 2006/0079311 A1 * 4/2006 | Nulph | 463/17 |
| 2006/0081713 A1 * 4/2006 | Carrender | 235/462.46 |
| 2006/0138236 A1 * 6/2006 | Hepworth et al. | 235/454 |
| 2006/0169784 A1 * 8/2006 | Collins et al. | 235/487 |
| 2006/0246994 A1 * 11/2006 | Walker et al. | 463/17 |
| 2007/0226071 A1 * 9/2007 | Kern et al. | 705/26 |
| 2008/0086414 A1 * 4/2008 | Ching | 705/39 |
| 2008/0257961 A1 * 10/2008 | Lubow | 235/462.01 |
| 2009/0149239 A1 * 6/2009 | Youssef et al. | 463/17 |
| 2010/0235250 A1 * 9/2010 | Bar-Levav | 705/23 |
| 2010/0280918 A1 * 11/2010 | Balent | 705/26 |

FOREIGN PATENT DOCUMENTS

| | | |
|---|---|---|
| KR | 2004 0018887 | 3/2004 |
| WO | WO 00/57316 | 9/2000 |

* cited by examiner

LOTTERY SALES SYSTEMS AND METHODOLOGY FOR SUPPORTING CROSS-PLATFORM REPORTING

PRIORITY CLAIM

The present application claims priority to U.S. Provisional Application Ser. No. 61/014,977, filed Dec. 19, 2007.

BACKGROUND

Presently, instant lottery tickets are offered at a wide variety of retail locations. For example, retail locations may maintain cases, displays, or other inventory points at which tickets for one or more types of instant lottery tickets are stored and/or sold. As items of monetary value, the lottery tickets must be treated more carefully than other inventory at the retail location. Presently, personnel at retail locations must devote substantial time manually counting instant tickets, such as at the beginning and/or end of a shift, business day, or other time interval.

Also, at many retail locations, sales of instant and other lottery tickets are handled using a lottery point-of-sale system or terminal dedicated to handling lottery transactions. The lottery system is typically not integrated with the retail establishment's point-of-sale (POS) system, and there is no easy way for retailers to record sales made using the lottery system with their own POS system.

SUMMARY

Objects and advantages of the invention will be set forth in part in the following description, or may obvious from the description, or may be learned through practice of the invention.

An instant ticket inventory and reporting system is provided that can be used to reduce or avoid the need for manual inventorying of instant lottery tickets. In operation, a barcode scanner interfaced to a lottery sales system can be used to scan the next available ticket for all instant games of interest at one or more inventory points. When instant win lottery tickets are activated for sale by the lottery terminal, the beginning inventory position is recorded and stored at the lottery terminal. By referencing data scanned for each game of interest to corresponding sale and/or other data, the lottery sales terminal can determine whether any discrepancies in the inventory of instant tickets are present. Further, additional analysis of the inventory data can be used to identify fast moving instant tickets, slow moving tickets, analyze price points of active games at specific stores, and/or to report stock-outs or impending stock-outs of tickets.

In some embodiments, the barcode scanner is interfaced to a lottery sales system terminal which is also used to manage the sale and payout of lottery tickets at the retail location. The barcode scanner may be interfaced to the terminal (or other system components) in any suitable way, including by a wireless connection.

In certain embodiments, the terminal or other system components may be further configured to transmit sales and/or inventory data to one or more central systems for further analysis. For example, sales and/or inventory data may be provided to state or other regulators of the instant win games or one or more other entities responsible for managing the instant win games.

In some embodiments, a lottery sales system can be configured to provide one or more reports that include a bar code corresponding to sales of a particular lottery game over one or more time periods of interest. For instance, in some embodiments, a lottery sales terminal can automatically create a report that includes a bar code for each one of a plurality of lottery products. The sales system/terminal can provide a report comprising information about any game(s) for which transactions are managed using the sales system/terminal.

After the report or reports are printed, the retailer can use the retailer's point of sale equipment to scan the bar codes for each lottery product. This can provide a cost effective method of inputting lottery sales data into a retailer point of sale system without the need for extensive software development efforts or substantial modification to the retailer's point of sale system.

For example, in some embodiments, the retailer point of sale system has access to a table of bar codes (such as UPC codes) designated for the range of lottery products of interest. Each bar code can correspond to a particular sales value of a particular lottery product.

In some embodiments, the retailer point of sale system can decode an embedded bar code. Thus, each bar code in the report can identify a product and a sales value without the need for a lookup table defining combinations of lottery products and sales values.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
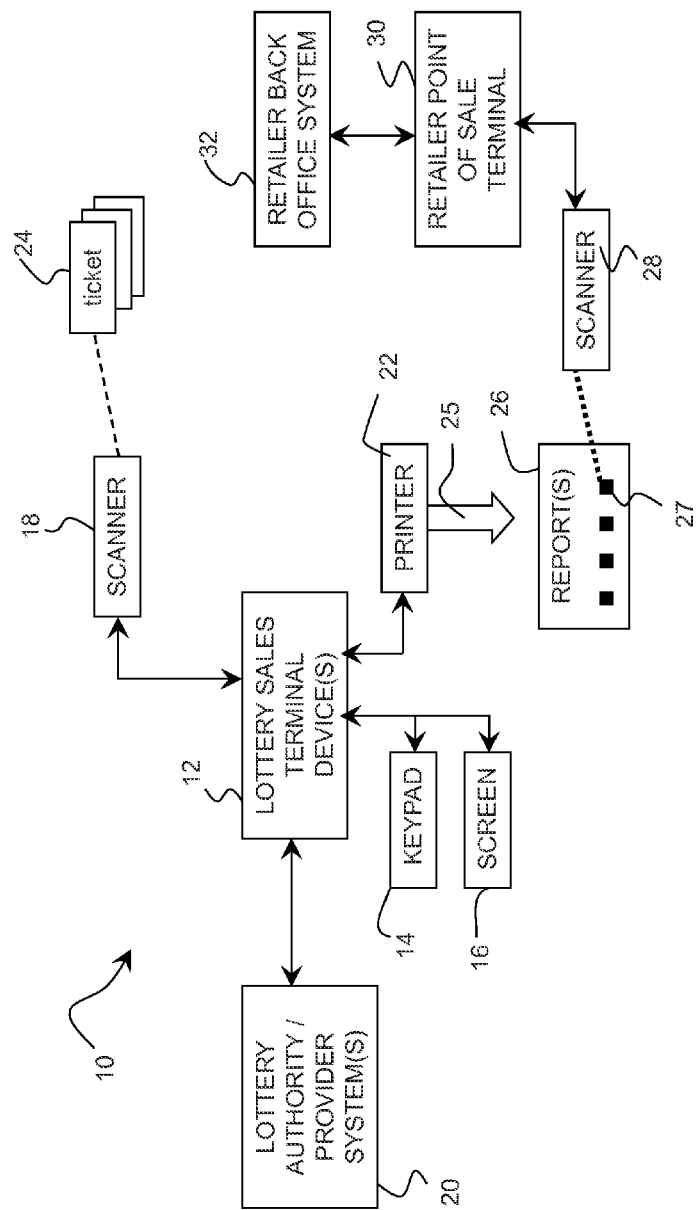
FIG. 1 is a block diagram showing components in an exemplary system which supports automated sales reporting in accordance with one or more aspects of the present subject matter.

FIG. 1 is a block diagram showing components in an exemplary system 10 which supports automated sales reporting in accordance with one or more aspects of the present subject matter. In this example, system 10 comprises a lottery sales terminal device or devices 12 ("lottery sales terminal") which is connected to a scanner 18, a printer 22, a keypad 14, and a screen 16. It will be understood that, in some embodiments, lottery sales terminal 12 is further connected to one or more additional printers or dispensers which are used for printing out and providing lottery tickets or other game components. Further, in some embodiments, screen 16 is a touch screen which provides the functionality of a keypad or keyboard 14.

In this example, the lottery sales terminal is further connected to one or more lottery authority systems or lottery provider systems 20. For instance, a state or other lottery authority may maintain a computer system (or systems) used to track and validate lottery activity at various locations.

Scanner 18 can comprise any suitable type of input device used to obtain data from machine-readable codes on objects. For instance, scanner 18 may be configured to use laser or other light to identify bar codes or other suitable indicia on lottery tickets, such as lottery tickets 24 illustrated in FIG. 1.

System 10 of FIG. 1 further comprises exemplary components associated with a retailer point-of-sale system. This example includes a retailer point of sale terminal 30 interfaced to a retailer back office system 32. Back office system 32 itself may be interfaced to one or more further systems (e.g. enterprise-level accounting, inventory, sales, etc. systems of the retailer) via local area or wide area networks. Further, back office system 32 may be interfaced to multiple point of sale terminals 30 depending on the particular retail location in question. In some embodiments the back office system functionality may run on the POS terminal with no back office system required.

Retailer point of sale terminal 30 can comprise any suitable number and arrangement of computing devices which are used to provide point-of-sale services. For instance, a general purpose or special purpose computer configured with appropriate software can be used to total sales amounts, accept tender, identify items scanned using point of sale scanner 28 by accessing lookup tables and other data available from the back office system 32, and the like. In some embodiments, the price look up file system table resides solely on the POS terminal. Further, point of sale terminal 30 can be configured to support various payment options and to provide other desired functionality.

In some embodiments, some or all of the functionality of the back office system 32 may be provided at one or more point of sale terminals 30. For instance, a point of sale terminal 30 at a small business could be used for handling sales transactions as well as product lookups, sales tracking, inventory, and the like.

Figure 2:
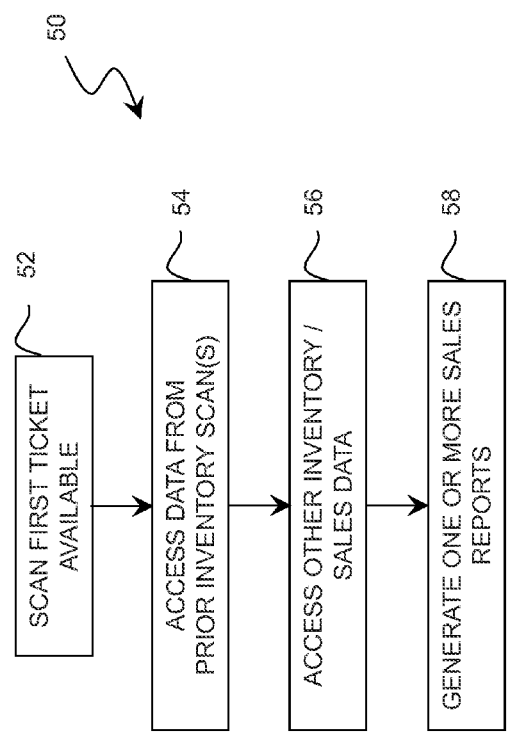
FIG. 2 is a flowchart showing steps in an exemplary process for automated ticket inventorying.

In some embodiments, the lottery sales system can support automated or semi-automated inventorying. FIG. 2 is a flowchart showing steps in an exemplary process 50 for automated ticket inventorying. This may be especially advantageous for use in conjunction with instant-win games which may otherwise need to be inventoried by hand. Typically, instant-win tickets carry one or more bar codes or other machine-readable indicia that include serial numbers or other unique identifiers for each ticket. By using knowledge of the ranges of serial numbers (and/or other identifiers), ticket sales can be tracked.

At step 52, for each game of interest, the first available ticket is scanned. For example, if the tickets are maintained in a roll or continuous strip in a dispenser, the next ticket to be sold may be at the output point of the dispenser. Then, at step 54, data from prior inventory scans (if available) is accessed. For instance, if the "presently-performed" scan (i.e. the scan at step 52 for the product of interest) occurs at the end of a shift, the prior scan for the game of interest may have occurred at the start of the shift, the start of the day, or the end of the last shift. Step 56 represents an optional step wherein other inventory or sales data is accessed. For instance, the lottery sales terminal may track ticket sales by counting the number of tickets sold in a particular game and/or by identifying the serial number (or other identifier) of tickets that are sold. Additionally, if sales of a new game are beginning, data from a prior scan will be unavailable at step 54. Thus, the other inventory/sales data can include information regarding the new game (e.g., an indication that the presently-performed scan is the "first" scan of the new game). In some embodiments, the other inventory/sales data can be provided from the retailer point of sale terminal 30.

At step 58, one or more sales reports are generated based on the scanned data and other accessed data. For instance, the presently-preformed scan may indicate the serial number of the next available ticket of a game. If a prior scan indicates a different serial number at an earlier point in time (e.g. at the beginning of a shift), then, based on data regarding the serial number range, the number of tickets that have been dispensed can be determined.

Multiple types of analysis can be involved in generating the report. For instance, the number of dispensed tickets can be cross-referenced with sales data to determine if any disparities exist. As another example, after accumulating data regarding several games over the same time interval, the "top sellers" and "low sellers" can be identified, and/or ticket sales may be analyzed by time interval. As a further example, based on comparing the serial number of the next available ticket in a game to data regarding the range of serial numbers that are available, the report may indicate whether a particular game is "low" on available tickets. For instance, if previous data indicates that 500 tickets were available at the start of a shift and 498 tickets were dispensed during the shift, an alert may be generated to indicate that only two tickets of an evidently-popular game remain available, and that an out-of-stock situation is imminent. Similarly, if the data indicates that all tickets were sold, the report can indicate that the game is out-of-stock.

The report can be provided in any suitable manner. For instance, some or all of the data may be displayed via screen 16 and/or the report may be printed using printer 22. In some embodiments, the data is provided to lottery authority or provider systems 20. For instance, if an entity provides and supports the lottery sales equipment on behalf of a state lottery commission or administration, the entity can analyze the sales data to help guide the retailer and/or to plan transfers of products (e.g. if the entity receives word that a game is nearly out-of-stock, the entity can make preparations to provide additional tickets of the game).

Returning to FIG. 1, system 10 is further configured to support cross-platform reporting of lottery sales from the lottery sales system components (e.g. the lottery sales terminal or terminals) to the retailer point-of-sale system. In accordance with the present subject matter, the retailer point-of-sale system is configured to recognize bar codes 27 which are included in one or more sales reports 26 which are provided by printer 22 of the lottery sales terminal 12. This allows for cross-system reporting of lottery sales without the need for integration between the lottery sales system and the retailer point of sale system. Instead, the same effect is accomplished via the use of one or more reports 26 and the existing point-of-sale equipment.

Reports 26 may be the same reports referenced above for tracking instant ticket (or other sales) based on scanning ticket indicia. However, reports 26 comprising bar codes 27 may be separate reports. Further, the instant ticket inventorying capability can be a wholly separate feature from cross-platform reporting via scannable sales reports, and some embodiments do not include both features. For instance, some lottery sales systems may be configured to provide scannable reports, but not to provide scanning-based ticket inventory capability.

Arrow 25 is used to illustrate that reports 26 are physically produced by printer 22 for scanning using point of sale system scanner 28, rather than data transfer over a wired or wireless connection.

In operation, lottery sales terminal 12 can be configured to track lottery sales by product over time and report sales per product over one or more time intervals of interest, such as hourly, by shift, by day, week, month, etc. When a sales report for one or more products is desired, lottery sales terminal 12 can provide a report which includes a bar code 27 (or other suitable machine-readable indicia) corresponding to each product of interest.

For example, in some embodiments, a standard UPC (Universal Product Code) will be generated by the lottery terminal for each combination of lottery product and sales amount. The retailer's existing point-of-sale system can be provided with suitable data, such as a look-up table, correlating each UPC code to a combination of lottery product and sales amount. In some embodiments, the look-up table can correlate a unique UPC to each lottery product of interest at each possible sale amounts over a range of sale amounts.

For instance, the table may define a UPC for each dollar value of "Classic Lotto" sales from $1 to $999. Sales amounts in excess of $999 could be indicated by using two or more UPCs (e.g. if total sales of "Classic Lotto" were $1250, then a UPC for $999 in sales of "Classic Lotto" and a UPC for $251 in sales of "Classic Lotto" could be provided in the report). The upper limit could be varied, and generally is used since, ultimately, the number of available UPC codes may be finite.

Further, the look-up table can provide for categorized reporting if the lottery sales terminal can provide reports by category in addition to (or instead of) individual products. For example, a retailer may sell a wide variety of instant-win games, but ultimately may desire information about the total amount of instant-win sales. The lottery sales terminal can sum all sales of games in the "instant win" category and provide such information via a UPC for the "instant win" category.

UPCs could also be correlated to other information of interest. For example, a range of UPCs could be defined for lottery payouts for use by the retailer in tracking the amount of money the retailer has provided to customers who redeemed winning lottery tickets over a period of interest.

Figure 4:
FIG. 4 shows a hypothetical example of a report which could be generated in a system supporting cross-platform reporting of lottery sales data.

In any event, appropriate UPCs or other codes are generated to provide the data of interest in a form that can be recognized by the retailer point-of-sale system. The UPCs are then included in one or more reports produced using printer 22. FIG. 4 shows a hypothetical example of a report 26 with corresponding bar codes 27A, 27B, 27C, and 27D, which would be generated for a retailer with $250 in sales for "Classic Lotto," $335 in sales for "Mega Millions," $529 in sales for a group category of "Instant Games," and lottery payouts of $226 ("Cashes"). In this example, the report further includes additional information 26A including the retailer name, reporting time period, and the like. Such information can be used for maintaining, organizing, and sorting the reports.

In some embodiments, bar codes 27 can be produced so as to include embedded UPC codes. Thus, it is possible for a single lottery product bar code to be provided with the sales amount embedded therein without the need for a unique UPC for each lottery product for each sales amount in a range. In such embodiments, the retailer's point-of-sale system should be able to decode embedded bar codes. Thus, the look-up table could identify lottery products by UPC codes, with the amount determined from the embedded bar code at scanning. From a configuration standpoint, implementing embedded bar code functionality will require knowledge of the particulars of the point of sale system which will be used in conjunction with the lottery sales system. In some embodiments, a combination of UPCs for some products with embedded sales figure UPCs and unique UPCs for each product/sales amount combination for other products could be used.

Figure 3:
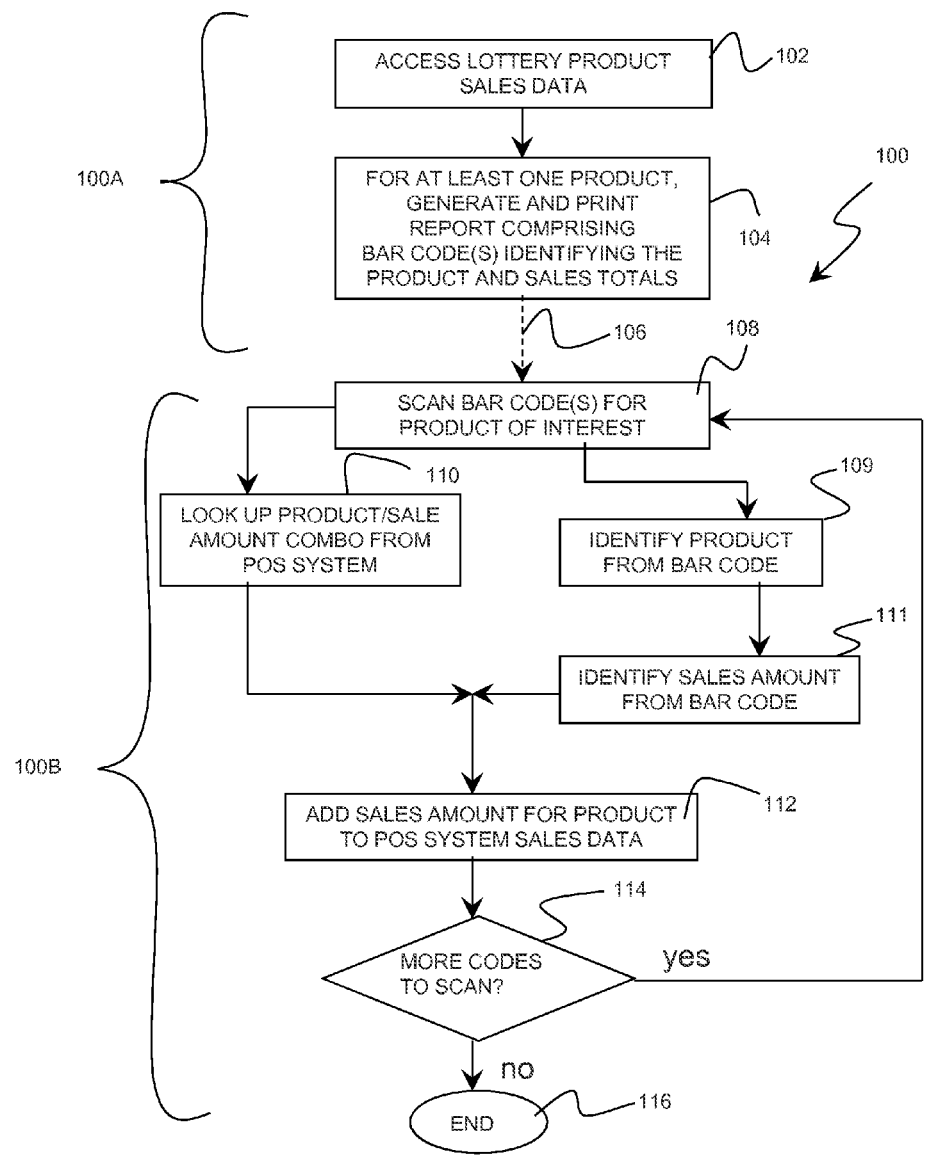
FIG. 3 is a flowchart showing steps in an exemplary process for reporting of sales between a lottery sales system and a retailer point-of-sale system.

FIG. 3 is a flowchart showing steps in an exemplary process 100 for reporting of sales between a lottery sales system and a retailer point-of-sale system. Steps 100A comprise actions taken by and with regard to the lottery sales system equipment, while steps 100B comprise actions taken by and with regard to retailer point-of-sale equipment.

At 102, the lottery sales system equipment, such as sales terminal 12, accesses lottery product sales data. The data may indicate sales for one or more terminals; for instance, a particular terminal may be configured to provide consolidated reporting for a plurality of terminals at a retail location. At step 104, a report is generated for at least one "product" and a report comprising one or more bar codes identifying the "product" and sales totals is printed. "Product" is in quotation marks since, as was noted above, the report may concern not only more actual lottery products, but may additionally or alternatively provide data regarding categories of products, or other lottery related information.

The data included in the report is formatted in accordance with the configuration of the retailer's point-of-sale equipment. For example, if the retailer point-of-sale equipment supports embedded bar codes, the report may include a bar code for a specific product of interest (e.g. "Super Lotto"), with the corresponding sales figure (e.g. "$250") encoded therein. Alternatively, if the retailer point-of-sale equipment is configured to look up product/sales figure combinations, the appropriate UPC is selected (e.g. the UPC corresponding to "Super Lotto" and $250 in sales) and printed on the report.

Step 106 represents the transfer or positioning of the printed report for subsequent action using the retailer point-of-sale equipment. As one example, an operator could take the sales report to an appropriate point-of-sale terminal for scanning. At step 108, the point-of-sale equipment is used to scan the bar code(s) for the product of interest. Two branches follow step 108 to illustrate alternatives which may occur depending upon the type of bar code (or other indicia) that is used.

Step 110 represents a processing step that occurs when each bar code represents a particular combination of a product and sales figure. If so, the corresponding combination of a lottery product and sales figure (e.g. "Super Lotto" sales of $200) are accessed from a table based on the bar code.

Alternatively, steps 109 and 111 represent processing which occurs if embedded bar codes (or other indicia) are used. At step 109, the particular product (e.g. "Super Lotto") is identified. At step 111, the particular sales amount is discerned from the embedded bar code. Of course, steps 109 and 111 could be reversed or carried out in parallel, if feasible.

Once the product and sales amount are suitably identified, then the data is used to update the appropriate point-of-sale system records. In this example, the point-of-sale system maintains a running total of product sales. Thus, the running total of "Super Lotto" is updated to reflect $250 in sales.

It will be understood that any type of operation which can occur based on scanning a UPC of a non-lottery product can now be performed for lottery products, categories, and the like. Thus, the retailer has the ability to input lottery sales data into a point-of-sale system without the need for major software development efforts or tedious manual input. Instead, a retailer need only configure UPC/PLU codes once during an initial setup (although, of course, codes may be updated from time to time for reporting different products or otherwise using and maintaining the point-of-sale system).

In some embodiments, the system can be fine-tuned to address potential difficulties that may arise through the use of reports including UPCs or other indicia. For instance, if the retailer's business practice is to scan instant tickets as such tickets are sold, the lottery sales terminal could be configured not to print instant ticket UPCs when providing sales reports. Thus, double-entry of instant games could be avoided.

As was noted above, in some embodiments, a lottery sales terminal 12 may be interfaced to one or more outside computer systems, such as those operated by a lottery authority and/or other entity administering lottery games or otherwise supporting lottery sales and the like. In some cases, accounting data may be provided for retailers via such outside computer systems, such as via a web-site or other resource accessible by the retailers. Data from either or both of the scanning-based inventory and the data underlying the sales reports could be provided to such outside systems, and made available as XML-formatted files (or in any other suitable format(s)). This could provide an additional or alternative method whereby retailers could integrate lottery sales with their back-office systems.

In several examples above, scanning of machine-readable indicia related to the use of laser scanners and/or bar codes (UPCs). It will be understood that the present subject matter can be used regardless of the underlying sensing technology used to read the visual indicia or the particular method of encoding the data into visual indicia. Furthermore, although examples above discussed a single retail location, reports and inventory could be tracked across multiple retail locations in addition to or instead of at single locations. Finally, although several examples used dollars ($), the underlying currency, currencies, or other indicators of value used in lottery and other transactions can vary.

The technology discussed herein makes reference to systems, servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server or other processes discussed herein may be implemented using a single server or multiple servers or other devices working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the other computer uses to access the actual data from a still further computer.

The various computer systems discussed herein are not limited to any particular hardware architecture or configuration. Embodiments of the methods and systems set forth herein may be implemented by one or more general-purpose or customized computing devices adapted in any suitable manner to provide desired functionality. For instance, one or more computing devices may be adapted to provide desired functionality by accessing software instructions rendered in a computer-readable form. The device(s) may be adapted or configured to provide additional functionality complementary or unrelated to the present subject matter, as well.

When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology, such as databases used to store lottery sales data, other lottery activity data, and other data may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method of cross-platform lottery activity reporting between a lottery sales terminal and a retailer point-of-sale (POS) system, the method comprising:
   accessing sales reporting data from the lottery sales terminal that indicates total sales of respective lottery products of interest and, for each lottery product of interest, generating and printing a machine-readable indicator corresponding to the total sales of the lottery product of interest;

entering the lottery activity data into the POS system by scanning the printed generated machine-readable indicator with a scanner that is interfaced with the retailer POS system; and with the POS system, correlating the machine readable indicators with the respective lottery products of interests and updating lottery product records in the retailer POS system with the sales data contained in the machine readable indicators, wherein the effect of integration between the lottery sales terminals and the POS system is accomplished through the reading of the machine readable indicators.

2. The method set forth in claim 1, wherein identifying the lottery product of interest and total sales of the lottery product of interest comprises decoding a total sales amount embedded in the machine-readable indicator.

3. The method set forth in claim 1, wherein identifying the lottery product of interest and total sales of the lottery product of interest comprises accessing a set of data correlating machine-readable indicators to combinations of lottery products and sales amounts.

4. The method set forth in claim 1, wherein a machine-readable indicator comprises a bar code.

5. The method set forth in claim 1, wherein generating a machine-readable indicator corresponding to the total sales of a lottery product of interest comprises:

selecting an indicator identifying the lottery product of interest; and embedding data in the indicator, the embedded data identifying the total sales amount.

6. The method set forth in claim 1, wherein generating a machine-readable indicator corresponding to the total sales of a lottery product of interest comprises:

selecting an indicator mapped to a combination of a sales amount and the lottery product of interest.

7. The method set forth in claim 1, wherein the sales reporting data further indicates total cash-outs and the computing device is further configured to generate a machine-readable indicator corresponding to the total cash-outs for inclusion in at least one report.

* * * * *